UNITED STATES PATENT OFFICE.

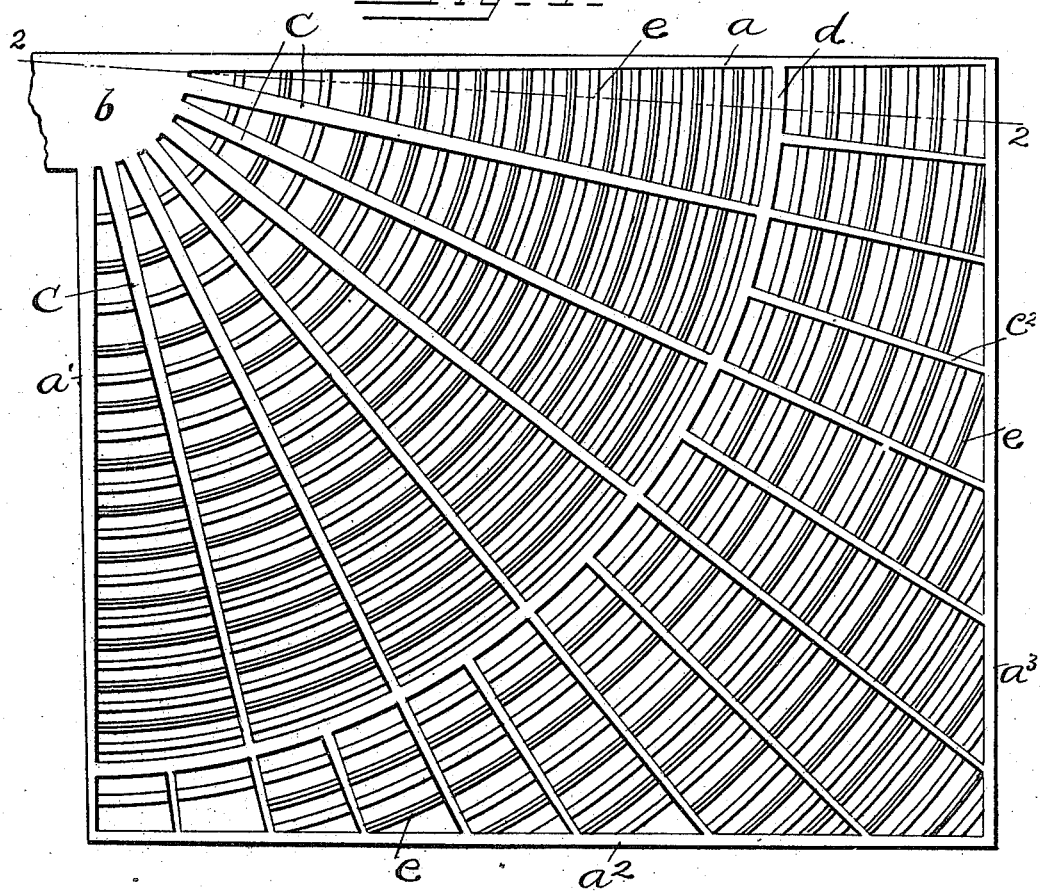

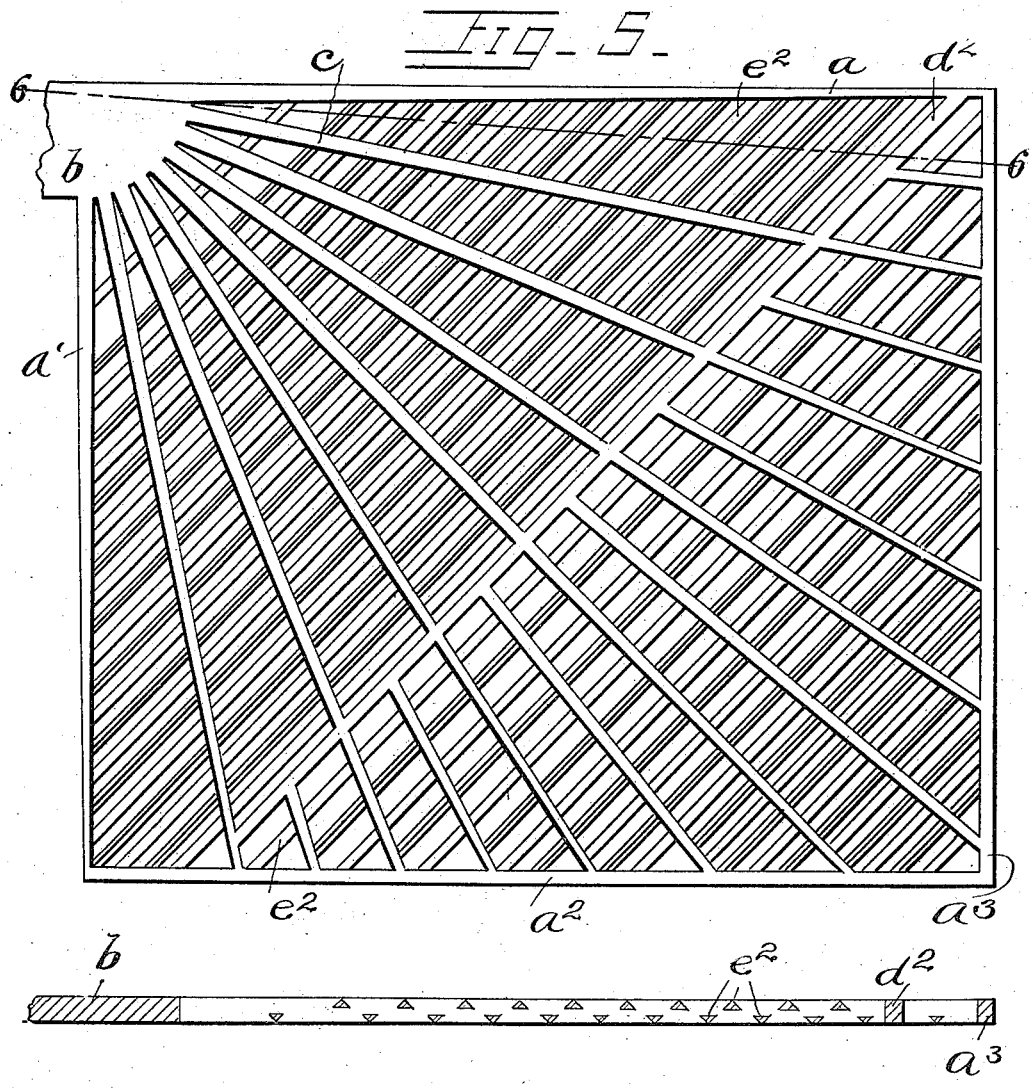

ERNEST F. WACKWITZ, OF CLEVELAND, OHIO, ASSIGNOR TO THE PEERLESS MOTOR CAR COMPANY, OF CLEVELAND, OHIO, A CORPORATION OF OHIO.

STORAGE-BATTERY GRID.

1,044,831.

Specification of Letters Patent.

Patented Nov. 19, 1912.

Application filed July 8, 1912. Serial No. 708,156.

*To all whom it may concern:*

Be it known that I, ERNEST F. WACKWITZ, a citizen of the United States, residing at Cleveland, in the county of Cuyahoga and State of Ohio, have invented a certain new and useful Improvement in Storage-Battery Grids, of which the following is a full, clear, and exact description.

This invention relates to storage battery grids, and has for its object to provide a grid which is strong mechanically at and adjacent the terminal or terminal extension of the grid, and which is especially adapted for heavy duty batteries which are required to deliver current at heavy amperage and low voltage.

The grid forming the subject matter of this application is designed especially for batteries intended to be used on motor vehicles for supplying current to an electric motor for engine starting purposes, which batteries are subjected to rough usage on such vehicles, and therefore are required to be especially strong at and adjacent the terminals of the grids and are required to supply to the starting motor current of considerable amperage. It will be understood, however, that my invention is not limited in its application to batteries for this particular purpose.

In carrying out my invention, I provide in the grids a number of integral current carrying ribs which extend radially from the terminal through the grid to different points on the frame and between these ribs I provide bars for holding the active material of the grid, the parts being so arranged that the ribs provide the necessary mechanical strength at an adjacent terminal and at the same time constitute low resistance current conductors which extend from many parts of the grid to the terminal and carry the current in practically straight paths directly to the terminal, so that all parts of the battery plate remote from as well as adjacent to the terminal are active.

Figure 3:
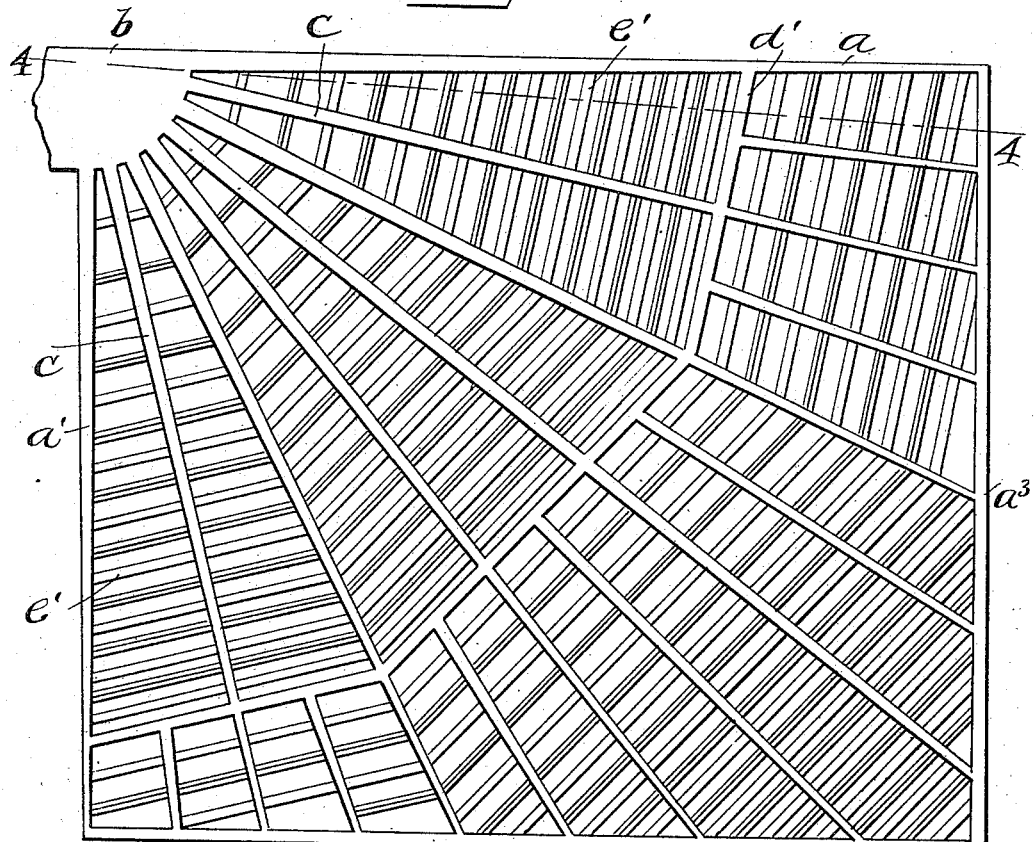
Figure 4:
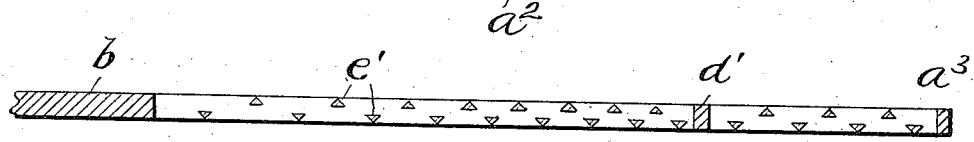

In the drawings wherein I have shown several forms of my invention, Figure 1 is a side elevation of a grid constructed in accordance with one form of my invention. Fig. 2 is a sectional view substantially along the line 2—2 of Fig. 1. Fig. 3 is a side elevation of a modified form of grid. Fig. 4 is a section substantially along the line 4—4 of Fig. 3. Fig. 5 is a side elevation of a further modification; and Fig. 6 is a section substantially along the line 6—6 of Fig. 5.

In all forms of my invention the grid is preferably rectangular in shape and includes an outer frame composed of the sides $a$, $a'$, $a^2$ and $a^3$. At one corner of the grid, and in this case at the junction of the sides $a$ and $a'$ is a terminal extension $b$. Radiating from the terminal $b$ are a number of integral ribs $c$ which are preferably equally distributed or spaced and extend in fan-like manner from the terminal across the grid so as to join the sides $a^2$ or $a^3$. As here shown there are six main ribs which extend from the terminal across the grid to the sides $a^2$ and $a^3$. At a distance from the terminal and intersecting the ribs $c$ is a transverse rib $d$ extending from the side $a$ to the side $a'$ which transverse rib is in the construction shown in Figs. 1 and 2 arc shaped, with the axis of the junction between the sides $a$ and $a'$ as a center of curvature. Extending from this arc-shaped rib $d$ to the sides $a^2$ and $a^3$ and located between the sides $a$ and $a'$ respectively, and the ribs adjacent thereto and also between adjacent ribs $c$ are short integral radial ribs $c^2$. All the ribs $c$ and $c^2$ and the sides $a$ and $a'$ are tapered so that the electrical resistance of the ribs and of the sides is gradually decreased from the ends remote from the terminal, thereby providing low resistance and the necessary current carrying capacity. I also provide between the radial ribs and also between the sides $a$ and $a'$ respectively, and the ribs adjacent thereto, integral cross bars which serve primarily to retain the active material or paste in the grid, these bars being in all forms of my invention preferably triangular in cross section, and those between any two ribs being relatively staggered, as shown in the cross sectional views.

In the form of my invention shown in Fig. 1, these transverse bars which are shown at $e$ are in arcs of concentric circles having as their center the intersection of the sides $a$ and $a'$ at the terminal $b$.

In the modification shown in Fig. 3, the transversely arranged rib here designated $d'$, which extends from the side $a$ to the side $a'$, across the several radial ribs $c$, is irregular in shape, extending in three different straight lines at right angles respectively to the two outermost ribs $c$, and to an imaginary line between the innermost pair of ribs $c$. Also in this modification, the transverse bars here designated $e'$ extend in straight lines parallel to the parts of the rib $d'$.

In the construction shown in Fig. 5, the main transverse rib, here designated $d^2$ is straight and extends in a diagonal direction across the grid, and the transverse bars here designated $e^2$ are arranged in straight lines parallel to the rib $d^2$.

The constructions are otherwise the same, and similar or corresponding parts of the three forms of the grid which are not modified, are in Figs. 3 to 6 given the same reference characters as Figs. 1 and 2.

It will be seen that with the constructions which I have shown and described, the grid has extremely low internal resistance, and all parts of the battery plate are active, in view of the fact that current can be conducted from nearly all parts of the plate directly to the terminal of the grid, the radial ribs providing straight and direct paths to the terminal. In fact, assuming that the bars $e$, $e'$ or $e^2$, divide the space between any two ribs, into divisions or compartments, it will be seen that for every compartment there are one or more conductors leading therefrom to the terminal in a straight line. This construction renders the grid admirably adapted for use in heavy duty batteries, which are required to deliver for short intervals at least, heavy amperage current, and this is accomplished without the necessity for as great surface area as is required with ordinary grid constructions. Furthermore, by providing the integral radial ribs $c$ with respect to the terminal, the grid is stronger at the terminal than at any other point, by reason of the fact that the ribs converge and are therefore closely arranged at the terminal, and also because the ribs are tapered and are wider at the terminal than at points remote therefrom. The grid is therefore in my construction strongest mechanically at the point where grids are usually weakest, and at the point where the greatest mechanical strength is required.

Having thus described my invention, what I claim is:—

1. A storage battery grid comprising a frame having a terminal, a plurality of ribs integral with the frame and extending in different directions radially outward from the terminal, and a plurality of transverse bars extending between the ribs and serving to hold the active material to the grid.

2. A storage battery grid comprising a frame having a terminal, a plurality of ribs integral with the frame and extending in different directions radially outward from the terminal, and a plurality of cross bars extending between adjacent ribs and between the sides of the frame and the ribs adjacent thereto.

3. A grid for storage batteries comprising a rectangular frame having at one corner a terminal or terminal extension, a plurality of ribs integral with the frame and extending radially outward from the terminal to different points on the frame, and a plurality of cross bars extending between the ribs and between the sides of the frame and the ribs adjacent thereto.

4. A grid for storage battery plates comprising a frame having a terminal, a plurality of ribs integral with the frame and extending radially outward from the terminal to different parts of the frame, a transverse rib extending across the grid and intersecting said radial ribs, and a plurality of shorter ribs located between the first mentioned ribs and extending from said transverse rib to the frame in radial directions with respect to the terminal.

5. A grid for storage batteries comprising a rectangular conducting frame having at one corner thereof a terminal extension, a plurality of equally spaced ribs integral with the frame and extending radially from the terminal extension to two sides of the frame, a plurality of cross bars extending between the ribs and between the outermost ribs and the adjacent sides of the frame so as to retain active material in the grid, said ribs being tapered and increasing in size from their ends remote from the terminal.

In testimony whereof, I hereunto affix my signature in the presence of two witnesses.

ERNEST F. WACKWITZ.

Witnesses:
A. F. KWIS,
A. J. HUDSON.

---

Copies of this patent may be obtained for five cents each, by addressing the "Commissioner of Patents, Washington, D. C."